INVENTOR.
WAYNE A. KARLGAARD
BY
HIS ATTORNEY

United States Patent Office 3,098,546
Patented July 23, 1963

3,098,546
SHOCK ABSORBER PISTON VALVING
Wayne A. Karlgaard, Englewood, Ohio, assignor to General Motors Corporation, Detroit, Mich., a corporation of Delaware
Filed Nov. 10, 1960, Ser. No. 68,433
2 Claims. (Cl. 188—88)

This invention relates to an hydraulic shock absorber of the direct-acting type having relatively telescoping parts.

An object of the invention is to provide an improved valving structure for the piston of the shock absorber that is constructed and arranged in a manner to reduce the overall axial length of the piston and to reduce thereby the dead length of the shock absorber.

Further objects and advantages of the present invention will be apparent from the following description, reference being had to the accompanying drawings wherein a preferred embodiment of the present invention is clearly shown.

Figures 1, 2:
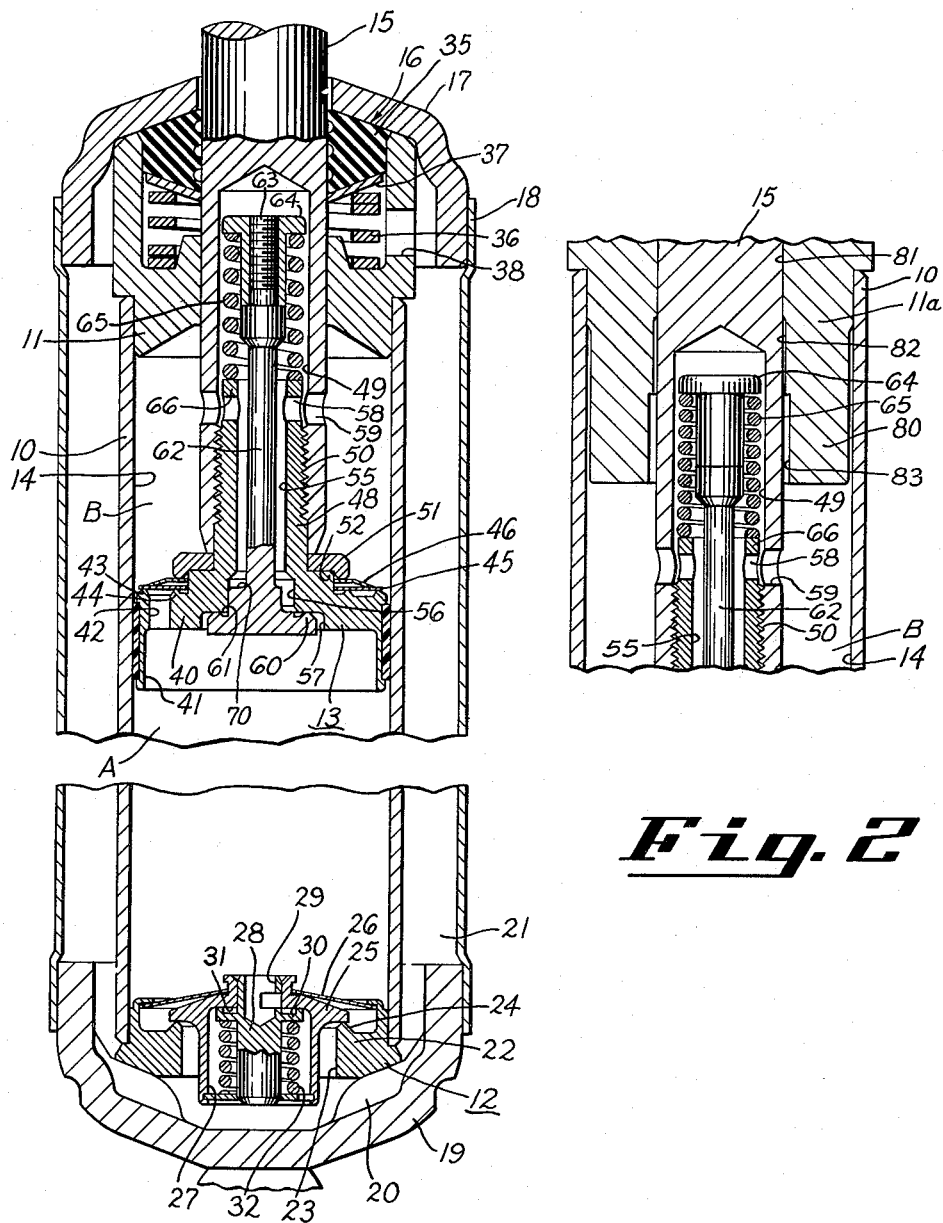
FIGURE 1 is a longitudinal cross-sectional view of a direct-acting type shock absorber incorporating features of this invention.
FIGURE 2 is a modified view of the shock absorber.

In this invention, the shock absorber consists of a pressure cylinder 10 closed at one end by a rod guide 11 and at the opposite end by means of a base valve structure 12. A piston 13 divides the cylinder chamber 14 into a compression chamber A and a rebound chamber B. The piston 13 is carried on a rod 15 that extends through the rod guide 11 and the rod seal structure 16. A closure cap 17 confines the rod seal structure 16 and has secured thereto a reservoir tube 18 that extends into engagement with a closure cap 19 at the opposite end of the shock absorber which also supports the base valve structure 12 on a plurality of ribs 20. The space between the reservoir tube 18 and the pressure cylinder 10 forms a reservoir space 21.

The base valve structure 12 comprises a closure disk 22 that has an axial bore 23 carrying a valve seat 24 on which the valve member 25 is seated by a disk-type finger spring 26. The valve member 25 has an axial bore 27 that carries a plug valve 28. The plug valve 28 has an axial bore 29 and a valve flange 30 that seats on the transverse wall 31 of the valve member 25 as retained thereon by the compression spring 32.

On movement of the piston 13 toward the base valve structure 12, fluid under pressure opens the plug valve 28 at a predetermined pressure value to displace hydraulic fluid from the compression chamber A into the reservoir space 21. On movement of the piston 13 away from the base valve structure 12, hydraulic fluid flows substantially freely through the axial bore 23, the valve 25 opening against the light finger spring 26 under this condition.

The rod seal structure 16 includes a seal member 35 engaging the periphery of the rod 15 as urged thereagainst by the compression spring 36 retained between the washer 37 and the rod guide 11. The guide 11 has an opening 38 that allows hydraulic fluid to flow freely from the rod seal chamber into the reservoir chamber 21 to remove pressure from the rod seal 35 in the event of leakage past the rod guide 11.

The piston 13 consists of a transversely extending piston head wall 40 having a skirt 41 that is not substantially greater in axial length than the thickness of the head wall 40 so as to decrease the axial length of the piston. The head wall 40 is provided with a plurality of fluid flow passages 42 spaced radially and circumferential around the axis of the piston 13. Annular valve seats 43 and 44 are positioned at opopsite sides of the passages 42 on which a disk valve 45 is seated by a disk-type finger spring 46 to close the passages 42 against flow of hydraulic fluid from the rebound chamber B into the compression chamber A and to allow hydraulic fluid flow from compression chamber A into rebound chamber B.

The piston 13 includes an axial extension 48 that is threadedly received in the threaded lower end of an axial bore 49 in the rod 15, as indicated by the threaded portion 50. A rigid annular washer 51 is retained between the lower end of the rod 15 and the shoulder 52 on the piston 13 to retain the spring 46 and the disk valve 45 in position as shown in FIGURE 1.

The axial extension 50 of the piston 13 has an axial bore 55 that communicates with an enlarged axial bore 56, which in turn communicates with an axial recess 57 provided in the head wall 40 of the piston 13. The extension 50 is also provided with radial passages 58 that connect the bore 55 of the extension 50 with the bore 49 in the rod 15, and the rod 15 is provided with radial passages 59 that connect the bore 49 of the rod 15 with the rebound chamber B providing thereby for fluid connection through the respective passages and bores with the compression chamber A.

A valve member 60 is seated on the shoulder 61 formed by the bottom wall of the recess 57 so as to close the passage connection between the compression chamber A and the rebound chamber B. The valve 60 includes a stem 62 that extends through the bore 55 of the extension 50 and terminates in a threaded portion 63 that threadedly receives a head member 64. A compression spring 65 is positioned between the head member 64 and the end 66 of the extension 50 to retain the valve member 60 on its shoulder seat 61 and thereby close the passage connection between the compression chamber A and the rebound chamber B. The valve member 60 is not substantially greater in thickness than the depth of the recess 57 so that the axial length of the piston 13 can be held to a minimum, the spring means retaining the valve 60 on its seat being disposed axially within the rod 15.

The valve 60 has a plurality of radially extending guide projections 70 to provide for axial guiding of the reciprocal movement of the valve member 60.

Positioning of the passages 59 in the rod 15 axially spaced from the head wall 40 of piston 13 provides for an hydraulic stop when the passages 59 enter the rod guide 11 and thereby close off communication between the rebound chamber B and the axial bore 49 of the rod 15.

To provide for a gradually increasing resistance in the hydraulic stop effect just described, there is shown in FIGURE 2 a rod guide member 11a that has a somewhat longer axial extension 80 provided with three stepped bores 81, 82 and 83 that gradually increase resistance to hydraulic fluid flow into the ports 59 in the rod 15 as the ports move into the rod guide 11a, thereby gradually increasing the resistance to movement of the piston 13 on the rebound stroke of the shock absorber.

While the embodiment of the present invention, as herein disclosed, constitutes a preferred form, it is to be understood that other forms might be adopted.

What is claimed is as follows:

1. In combination in a hydraulic shock absorber construction, a cylinder, a piston reciprocable in said cylinder and dividing the same into compression and rebound chambers, a piston rod carrying the piston and extending through a rod seal at one end of said cylinder, said rod having an axial bore in the end thereof adjacent the said piston, said piston having an axial extension projecting into said bore in said rod attaching said piston to said rod thereby in abutting relation to the end of said rod, said piston having an axial bore extending through the same including said extension thereof, said piston having a shoulder around said bore therein on the side thereof in said compression chamber, a valve member seated on said shoulder and including an axially extending stem projecting through said bore in said piston projection and into said axial bore in said rod, said rod having a transverse bore connecting the axial bore thereof with said rebound chamber, and spring means between the axial extension on said piston and the end of said stem in said axial bore in said rod urging said valve member into seating engagement with said shoulder, said axial extension on said piston having passage means therein connecting the axial bore in the said extension with the axial bore in said rod to provide thereby free flow of hydraulic fluid through the said transverse bores in said rod and said piston extension when said spring is fully closed by full opening of said valve.

2. In combination in a hydraulic shock absorber construction, a cylinder, a piston reciprocable in said cylinder and dividing the same into compression and rebound chambers and having a transversely extending head wall, a piston rod carrying the piston and extending through a rod seal at one end of said cylinder, said rod having an axial bore in the end thereof adjacent said piston, said piston having an axial extension projecting from the said head wall into said bore in said rod attaching thereby said piston to said rod, said piston head wall having a plurality of hydraulic fluid flow passages therein positioned radially around said extension and including valve seat means on the side thereof in said rebound chamber, a disk valve member around said extension seated on said seat means, disk valve spring means around said extension seating said disk valve, a rigid retaining washer around said extension and clamped between said piston head wall and the end of said rod retaining thereby said valve and valve spring on said piston head wall in said seating position, said piston having an axial bore extending through the same including said extension thereof, said piston having a recess around said bore thereon on the side thereof in said compression chamber forming a shoulder, a valve member having a valve head seated on said shoulder with said head substantially contained within said recess and including an axially extending stem projecting through said bore in said piston projection and into said axial bore in said rod, said rod having a transverse bore connecting the axial bore thereof with said rebound chamber, and spring means between the axial extension on said piston adn the end of said stem in said axial bore in said rod urging said valve member into seating engagement with said shoulder, said stem having a head portion on the end thereof threadedly received on the end of said stem with one end of said spring engaging said head portion and the opposite end engaging the end of said extension on said piston and said extension on said piston is threadedly received in the end of said bore in said rod.

References Cited in the file of this patent

UNITED STATES PATENTS

| | | |
|---|---|---|
| 2,465,680 | Focht | Mar. 29, 1949 |
| 2,507,268 | Patriquin | May 9, 1950 |
| 2,604,193 | Wyeth | July 22, 1952 |
| 2,702,099 | Lautz | Feb. 15, 1955 |
| 2,760,604 | Wyeth | Aug. 28, 1956 |
| 2,950,785 | Patriquin | Aug. 30, 1960 |

FOREIGN PATENTS

| | | |
|---|---|---|
| 1,074,758 | France | Apr. 7, 1954 |
| 1,082,153 | France | June 16, 1954 |
| 1,097,456 | France | Feb. 16, 1955 |
| 874,681 | Germany | Apr. 27, 1953 |
| 613,960 | Great Britain | Dec. 7, 1948 |
| 653,286 | Great Britain | May 9, 1951 |
| 661,269 | Great Britain | Nov. 21, 1951 |
| 726,327 | Great Britain | Mar. 16, 1955 |
| 465,645 | Italy | Sept. 17, 1951 |